United States Patent [19]

Barda

[11] Patent Number: 4,468,480

[45] Date of Patent: Aug. 28, 1984

[54] ESTER AND HALOGEN CONTAINING POLYOLS

[75] Inventor: Henry J. Barda, North Brunswick, N.J.

[73] Assignee: Ethyl Corporation, Richmond, Va.

[21] Appl. No.: 385,782

[22] Filed: Jun. 7, 1982

[51] Int. Cl.$^3$ .................... C08G 18/14; C08G 18/46; C08G 63/68

[52] U.S. Cl. .................... 521/171; 521/172; 521/129; 525/48; 525/49

[58] Field of Search .................... 521/171, 172, 129; 525/48, 49

[56] References Cited

U.S. PATENT DOCUMENTS

| | | | |
|---|---|---|---|
| 3,340,136 | 9/1967 | Burns et al. | 525/49 |
| 3,454,530 | 7/1969 | Case et al. | 260/75 |
| 3,565,812 | 2/1971 | Anderson et al. | 252/182 |
| 3,585,185 | 6/1971 | Levis, Jr. et al. | 260/210 |
| 3,639,541 | 1/1972 | Austin et al. | 260/952 |
| 3,639,542 | 2/1972 | Pizzini et al. | 260/952 |
| 3,642,646 | 2/1972 | Marcus | 252/182 |
| 3,676,376 | 7/1972 | Svoboda et al. | 260/2.5 |
| 3,989,653 | 11/1976 | Baldino et al. | 260/2.5 |
| 4,014,828 | 3/1977 | Thorpe | 525/49 |
| 4,264,745 | 4/1981 | Foucht | 521/171 |

FOREIGN PATENT DOCUMENTS 993451  7/1976  Canada ................. 260/472.3

Primary Examiner—John Kight, III
Assistant Examiner—M. L. Moore
Attorney, Agent, or Firm—Donald L. Johnson; John F. Sieberth; Teresa M. Stanek

[57] ABSTRACT

A normally liquid, flame retardant polyol ester prepared by a process comprising reacting a halogen containing anhydride of a dicarboxylic acid or a mixture of said anhydrides with an aliphatic polyol having at least three hydroxy groups and an aliphatic diol, to obtain a substantially fully esterified halogen containing product in which the acid number does not exceed 10, with the optional removal of unreacted diol during the course of the reacting or subsequent to the reacting. This flame retardant polyol ester may be used in the preparation of polyurethanes or polyesters.

12 Claims, No Drawings

4,468,480

ESTER AND HALOGEN CONTAINING POLYOLS

BACKGROUND OF THE INVENTION

1. Field of the Invention

This invention relates to a novel ester and halogen containing polyol. More particularly, this invention relates to the preparation of a flame retardant polyol ester and its use in polyurethane and polyester compositions.

2. Description of the Prior Art

Polyurethanes are usually obtained by the reaction of di- or polyisocyanates with polyhydroxy compounds, such as polyethers, polyesters or glycols. The problem of the flammability of these polymer compositions has received considerable attention. A variety of compounds are known that provide satisfactory flame resistance, smoke suppression and self-extinguishing properties when added to polyurethane compositions.

It is known that the polyhydroxy compounds themselves which react with the di- or polyisocyanates can be modified to impart flame retardant properties to the resultant polyurethane composition.

Some prior art methods of forming flame retardant polydroxy compounds, also known as polyols, involve a two step process. A halogen containing anhydride is combined with a polyol to form a half-ester. The half-ester is then reacted with an alkylene oxide to obtain a polyol.

U.S. Pat. No. 3,642,646 discloses polyol compositions useful in preparing rigid foam compositions. These polyols comprise the reaction adducts of polyfunctional aromatic carboxylic acid anhydrides or chlorendic anhydride and polyether polyols. It specifically teaches the use of half esters based on a polyol and tetrabromophthalic anhydride.

U.S. Pat. No. 3,585,185 discloses a process for preparing ester-containing polyols by the reaction of alkylene oxide condensates of organic compounds having at least two active hydrogen atoms with a halogen-containing organic acid anhydride and an alkylene oxide.

U.S. Pat. No. 3,454,530 teaches the use of polyols useful in the preparation of rigid polyurethane foams. These polyols are prepared by the reaction of a di- or tri-alkanolamine with a cyclic anhydride of an organic dicarboxylic acid and a lower alkylene oxide.

Canadian Pat. No. 993,451 discloses halogen-substituted aromatic amide-ester polyols and their use in a flame retardant flexible polyurethane foam.

U.S. Pat. No. 3,676,376 teaches the use of polyester polyols based on tetrabromophthalic anhydride, an aliphatic dicarboxylic acid, a polyol and an aliphatic diol.

U.S. Pat. Nos. 3,565,812, 3,639,541 and 3,639,542 are directed to the preparation of halogen-containing organic acid anhydrides based on ester- and phosphorous-containing polyols.

U.S. Pat. No. 4,264,745 teaches the use of the reaction product of tetrabromophthalic anhydride, dibromoneopentyl glycol and an alkyloxide.

U.S. Pat. No. 3,989,653 teaches the preparation of simple diesters of tetrabromophthalic anhydride comprising the reaction product of tetrabromophthalic anhydride and a polyhydroxy compound containing at least three hydroxyl groups. Example 3 involves the esterification of tetrabromophthalic anhydride and an aromatic diol.

Copending application S-4990 filed herewith claims a normally liquid flame retardant polyol prepared by a process comprising reacting a halogen containing anhydride of a dicarboxylic acid or a mixture of said anhydrides and about 2–10 moles of an aliphatic diol or mixture of diols per mole of said anhydride to obtain a substantially fully esterified halogen containing product in which the acid number does not exceed 10 with the optional removal of unreacted diol during the course of the reacting or subsequent to the reacting.

The novel flame retardant polyol prepared by the process of the present invention has an advantage over the flame retardant polyols found in the prior art. Polyol esters made from halogen containing anhydrides or acids, especially those based on tetrabromophthalic anhydride, have a high viscosity and are difficult to handle by conventional processing methods. Pumps are generally used in the preparation of polyurethane foams. The viscosity of the polyol should preferably by 25,000 cps at 25° C., or lower, to be pumped in a convenient manner. The polyol ester taught by the present invention is liquid and has a low viscosity and is easily handled by conventional processing techniques.

The halogen and ester containing polyols formed by the practice of the present invention are especially useful in the preparation of flame retardant polyurethane compositions. The polyols of the present invention are especially advantageous because they have an average functionality greater than 2. Rigid polyurethane foams prepared using a low functionality polyol have a reduced crosslinked density within their structure. Polyurethane foams prepared by using the higher functionality polyols of the present invention have a higher crosslink density since there are more hydroxy groups per molecule to react with free isocyanate groups. The higher crosslink density is advantageous because this polyurethane foam would have less tendency to melt when exposed to fire and forms a self-supporting insular char which protects the rest of the foam from burning. Higher crosslink density also results in polyurethane foams with better physical properties.

SUMMARY OF THE INVENTION

In accordance with the present invention, a normally liquid, low viscosity flame retardant polyol ester can be prepared by reacting a halogen containing anhydride of a dicarboxylic acid or a mixture of said anhydrides with an aliphatic polyol having at least three hydroxy groups and an aliphatic diol, to obtain a substantially fully esterified halogen containing product in which the acid number does not exceed 10, with the optional removal of unreacted diol during the course of the reacting or subsequent to the reacting. The flame retardant polyol ester formed by the practice of the present invention has an average of more than two free hydroxy groups which will react with the NCO functions of a polyisocyanate to form urethane groups. The polyol may also be used to prepare polyols. The polyurethane or polyester is made flame retardant without the necessity of using additional reactive or additive flame retardant compounds although they may be used if desired.

DESCRIPTION OF THE PREFERRED EMBODIMENTS

The present invention relates to a flame retardant ester and halogen containing polyol for use in polyurethane compositions. A preferred embodiment is a normally liquid flame retardant polyol ester prepared by a process comprising reacting a halogen containing anhydride of a dicarboxylic acid or a mixture of said anhydrides with an aliphatic polyol having at least three hydroxy groups and an aliphatic diol, to obtain a substantially fully esterified halogen containing product in which the acid number does not exceed 10, with the optional removal of unreacted diol during the course of the reacting or subsequent to the reacting.

Halogen containing anhydrides used in preparing the reactive flame retardant polyol of the present invention have the structure:

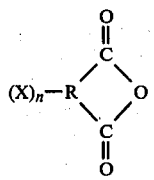

wherein R is a hydrocarbon group having the valence n+2 and is selected from the group consisting of benzene groups, naphthalene groups and alicyclic hydrocarbon groups containing 5 to 10 carbon atoms, X is selected from the group consisting of bromine and chlorine and n is an integer from 1 to 6. Typical halogenated dicarboxylic anhydrides include:
3-chlorophthalic anhydride,
4-bromophthalic anhydride,
3,6-dibromophthalic anhydride,
tetrabromophthalic anhydride,
tetrachlorophthalic anhydride,
1,4,5,6,7,7-hexachlorobicyclo(2.2.1)-5-heptene-2,3-dicarboxylic,
5,6,7,8,9,9-hexachloro-1,2,3,4,4a,5,8,8a-octahydro-5,8-methano-2,3-naphthalene dicarboxylic anhydride,
1,2,3,4,5,6,7,7-octachloro-3,6-methano-1,2,3,6-tetrahydrophthalic anhydride,
1,4-dichloro-2,3-naphthalene-dicarboxylic anhydride and
1,4-dibromo-2,3-naphthalene-dicarboxylic anhydride.

Mixtures of any of the above anhydrides may also be employed as well as mixtures of the above anhydrides and nonhalogenated anhydrides. Preferably, the halogen containing anhydride is tetrahalophthalic anhydride. More preferably, the halogen containing anhydride is tetrabromophthalic anhydride.

It has also been found to be advantageous to include in the reaction mixture a basic material in an amount sufficient to neutralize any residual inorganic acid present in the halogen containing anhydride. An aqueous solution of any material which has a pH greater than about 8 may be employed. Representative materials include, for example, alkali metal and alkaline earth metal hydroxides; carbonates and bicarbonates, such as sodium hydroxide, sodium carbonate, sodium bicarbonate, potassium hydroxide, and calcium carbonate; ammonium hydroxide; and salts such as sodium acetate. Of these, preferred results have been achieved when sodium acetate is employed in the reaction mixture.

Aliphatic diols include alkylene glycols and linear and branched polyether glycols having a plurality of ether linkages containing two hydroxyl groups and being substantially free from functional groups other than hydroxyl groups. Among the diols which are useful in the practice of this invention are ethylene glycol, propylene glycol, butylene glycol, 1,6-hexanediol, and the like.

Preferred diols are the polyether glycols. These are a well-known class of diols and have the formula:

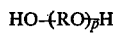

wherein p is an integer from two to about 100 and R is a divalent aliphatic hydrocarbon group containing about 2 to about 4 carbon atoms. More preferably, R is 2 or 3 carbon atoms. In a highly preferred embodiment R is —CH$_2$CH$_2$— and p is an integer from 2 to 10.

Polyether glycols include polyoxypropylene, polyoxypropylene-oxyethylene and polyoxybutylene diols. The preferred diols include diethylene glycol, dipropylene glycol, triethylene glycol and tripropylene glycol. Any combination or mixture of diols may be used in the practice of the present invention. The most preferred aliphatic diol is triethylene glycol.

The amount of aliphatic diol used in the practice of the present invention varies over a wide range and depends on the properties of the flame retardant polyol desired. Generally, from about 0.5 to about 2.0 moles of diol are added per mole of halogen containing anhydride of a dicarboxylic acid or a mixture of said anhydrides. Preferably, the amount of diol ranges from about 0.75 to about 1.75 and most preferably the amount of diol ranges from about 1.0 to about 1.5.

Also used in the practice of the present invention are polyols containing at least three hydroxy groups. Representative polyols having an average functionality of at least three include:
glycerol,
trimethylolethane,
trimethylolpropane,
triethanolamine
pentaerythritol,
sucrose,
glycosides,
tetramethylol bisphenol-A,
and the like.

The preferred polyol is glycerine.

The amount of aliphatic polyol having at least three hydroxy groups varies over a wide range and depends on the properties of the flame retardant polyol desired. Generally, from about 0.10 to about 1.5 moles of moles of polyol having at least three hydroxy groups are used per mole of halogen containing anhydride of a dicarboxylic acid or mixture of anhydrides. Preferably, the amount of polyol ranges from about 0.5 to about 1.25 and most preferably the amount of polyol ranges from about 0.8 to about 1.0.

The reaction should be carried out at a temperature high enough to allow the reaction to proceed, yet not so high as to cause degradation of the reactants or products, a useful range in which to experiment is about 100°–250° C. The preferred temperature range is from about 120° C. to about 190° C. At temperatures below about 120° C. very long reaction times are required, whereas, at temperatures above about 190° C. degradation or polymerization of the reactants may occur. A more preferred temperature range is from about 175° C. to about 190° C.

The reaction is considered complete when the acid number approaches zero. However, it is unnecessary to take the reaction to this point and an acid number of 0 to 10 mg KOH/g is generally adequate. Low acid numbers are preferred since this minimizes undesirable side reactions and maximizes the number of hydroxy groups able to react with the —NCO functions of the polyisocyanate. Completion of the reaction of the present invention is determined by periodically removing samples from the reaction mixture and titrating with base.

Optionally, the unreacted diol may be removed from the reaction mixture during the course of the reacting or subsequent to the reacting. Some diol will react with the halogen containing anhydride of a dicarboxylic acid or a mixture of anhydrides. An excess of diol is advantageous because it assists in pushing the reaction to completion. This excess diol may be entirely removed from the reaction product or a portion of it may be removed.

In addition to using diol to assist in pushing the reaction to completion, products formed as a result of the reaction can be removed to increase reaction rate. Water is formed as a result of the esterification. By removing water an increase in reaction rate can be achieved. There are at least two ways to remove the water from the reaction system. One way is to evaporate the water by sweeping it out of the reaction system using an inert gas such as nitrogen. Some diol is also removed from the reaction system by this technique. Another method is to azeotropically remove the water using an inert water immiscible solvent. The solvent selected selected also must possess the proper boiling point to bring the system to the correct temperature. Typical solvents include natha, xylene, toluene, cumene, heptane, decane, and the like.

The reactants may be added concurrently or sequentially. The order of mixing the reactants does not affect the final product obtained. In a most preferred embodiment the anhydride, diol and polyol are all mixed together and heated to esterification temperature while removing out water and optionally part but not all of the diol.

The ester and halogen containing polyol prepared by the process of the present invention are very useful in making flame retardant, self extinguishing polyurethane compositions. Such compositions are made by reacting a polyisocyanate (e.g. toluene diisocyanate, methylene-bis-phenylisocyanate, etc.) or polyisocyanate prepolymer with a polyol (e.g. polypropylene glycol, hydroxy-terminated polyester, etc.) and optionally a polyamine (e.g. methylenebis-ortho chloroaniline, ethylated toluene diamine, etc.). Other ingredients include a catalyst and optionally a blowing agent. In a preferred embodiment the halogen containing polyol of the present invention is substituted for part of or all of the polyol normally used depending upon the degree of flame retardance needed.

The organic di- or polyisocyanates used in the manufacture of polyurethane are known to the art. Any organic di- or polyisocyanate is suitably employed in producing the flame-retardant compositions of this invention. Combinations of polyisocyanates may also be used. Typical examples of suitable olyisocyanates for use in preparing the flame-retardant polyurethanes of this invention are
1,6-hexamethylene diisocyanate,
1,4-tetramethylene diisocyanate,
m-phenylene diisocyanate,
1-methoxyphenyl-2,3-diisocyanate,
4,4',4''-triphenylmethane triisocyanate,
4,4'-dimethyldiphenylmethane-2,2',5,5'-tetraisocyanate,
toluene diisocyanate and
methylene-bis(phenylisocyanate).

The polyisocyanate may be in the form of a prepolymer. These are generally isocyanate terminated polymers of a diisocyanate and a polyol.

The amount of isocyanate used varies slightly depending upon the nature of the polyurethane being prepared. A sufficient amount of organic polyisocyanate is used to stoichiometrically combine with the polyol to produce polyurethane. In general, the polyisocyanates are employed in amounts that provide from 80 to 150 percent, preferably from 90 to 120 percent of the stoichiometric amount of the isocyanate groups required to react with the reactive hydrogen atoms present on the hydroxyl groups or amino groups of the reactants in the polyurethane-producing reaction mixture.

Any of the conventional catalysts employed in polyurethane technology can be used. Some examples of useful catalysts which can be employed are tertiary amines, such as tetramethyl-1,3-butane diamine, triethylene diamine, triethanolamine, N-methylmorpholine, N-ethylmorpholine, tribenzylamine, N,N-dimethylbenzylamine, as well as tin compounds, such as dibutyl tin dilaurate, stannous oleate, stannous octoate, and others.

In addition to the flame retardant polyol prepared by the process of the present invention, any suitable organic polyol or combination of polyols, including both aliphatic and aromatic may be used, such as polyether polyols and mixtures of polyether polyols and poly-(ethylene glycol) adducts of pentaerythritol, sucrose, sorbitol, alpha-methylglucoside, butanediol, trimethylolpropane, and the like.

Polyurethanes are used in both the unfoamed and the so-called foam form. The most preferred embodiment of the present invention is a flame retardant, self-extinguishing polyurethane foam comprising the flame retardant polyol of the present invention, sufficient di- or polyisocyanate to combine with said polyol to produce polyurethane foam, a foam-forming catalyst and a blowing agent.

Polyurethane foams may be either flexible or rigid. Polyurethane foams are normally prepared from diisocyanates and hydroxyl-terminated polyether or polyesters. Linear or only slightly branched polymers are used to provide flexible foams, whereas more highly branched polymers produce rigid foams. Appropriate catalysts and stabilizers control the foam formation and cure. In general, a foamed polyurethane is produced when low boiling liquids or gaseous blowing agents, are incorporated into, or generated by, the polyurethane-forming reactants. Blowing agents which may be employed in the preparation of foamed polyurethanes include, for example, water either alone or admixed with other compounds, such as an aqueous solution of the catalyst. When water is employed, it reacts with an excess of the isocyanate to generate carbon dioxide, thereby resulting in a foam. Water is well known as a blowing agent in the preparation of flexible polyurethane foam. Other useful blowing agents especially desirable in rigid polyurethane foams include the chlorinated and fluorinated alkanes having from one to about three carbon atoms, such as the chlorofluormethanes, the chlorofluoroethanes and the chlorofluorobutanes. The amount of blowing agents employed can be varied over a wide range as is well known to those skilled in the art depending primarily upon the density desired in the foam product.

A wetting agent or surface-active agent is generally necessary for production of high grade polyurethane foam since the foams may collapse or contain very large uneven cells. Numerous wetting agents have been found satisfactory. Non-ionic surfactants are preferred.

Examples of common surface active agents include silicone compounds, silicone oil mixtures and the polyethylene glycol ethers of long chain alcohols. For most applications, the surfactant is employed in an amount equal to from about 1.5 to about 2.5 parts by weight per 100 parts by weight of the polyol blend in the foam-forming compositions. An emulsifier may also be used depending on the exact properties of the polyurethane desired.

In preparing a polyurethane composition, one employs a temperature which affords a reasonable rate of reaction and does not cause an untoward amount of undesirable side reactions. The exact reaction temperature employed is not critical. In general, one uses temperatures from about 20° C. to about 350° C. In general, the reaction is conducted under ambient pressures since these are most economical. However, the reaction pressure is not critical. Superatmospheric and subatmospheric pressures can be utilized if desired. In general, vacuum or partial vacuum offers no material advantage. Elevated pressures up to 1,000 psig or more can be utilized when it is desired to conduct the process at a temperature above the normal boiling point of one or more materials in the reaction mixture.

The reaction time is not critical, but depends to some extent on the inherent reactivity of the reactants and other reaction conditions employed. In general, reaction times of from about 15 minutes to ten days are sufficient.

Solvents are not necessary in the preparation of polyurethanes. However, suitable solvents include aromatic hydrocarbons such as benzene, xylene, toluene; the various chlorinated benzenes such as chlorobenzene; dimethoxylene glycol; dimethylformamide; or any other normally liquid material which is also liquid within the above-mentioned temperature range and non-reactive under the reaction conditions.

The flame-retarded urethane polymers of this invention can take the form of foamed products, elastomers, surface coatings and the like. They may be formed in accordance with any of the processing techniques known to the polyurethane art such as the prepolymer, quasi-pre-polymer and "one-shot" techniques.

Polyurethane compositions made using the polyols of the present invention are flame retardant and self-extinguishing. However, additional flame retardants compounds may be added to the polyurethane depending on the properties and compositions of the polyurethane desired. These additional flame retardant compounds may include other halogenated organic flame retardants or flame retardant phosphorous compounds well-known in the art.

Flame retardant synergists may also be employed in the preparation of the polyurethane compositions of the present invention. Inorganic synergists include antimony oxide, zinc oxide, zinc borate, and the like. Examples of organic synergists are tris-2-chloro-ethylphosphate, tris-2,3-dibromopropylphosphate, polyammonium phosphate, and the like.

The polymer composition can also have the usual fillers, dyes, pigments, plasticizers, anti-static agents, stabilizing agents, and the like incorporated therein, if desired.

The flame retardant polyols of the present invention may also be used to prepare polyesters. The polyols of the present invention are especially useful in unsaturated polyesters.

Typical polyesters of this invention can be made according to the techniques described in the "Encyclopedia of Polymer Science and Technology", Interscience Publishers, New York, New York (1969), Volume II, pages 1-168. Polyester compositions are made from the flame retardant polyol esters of the present invention and aromatic dibasic acids and/or anhydrides. Other dihydric alcohols may be used in addition to the flame retardant polyols of the present invention.

The polyesters are based on pre-polymers which may be made by the esterification of dihydric alcohols with unsaturated and modifying dibasic acids and/or anhydrides. The unsaturated polymer is mixed with an unsaturated monomer, e.g., styrene, with which it crosslinks. A catalyst, polymerization inhibitor and inert filler are among the typical additives.

The following examples illustrate halogen containing polyol esters of the present invention.

EXAMPLE 1

Into a 500 ml resin kettle provided with a Dean and Stark trap was charged 2.3 g of sodium acetate, 92.1 g (1.0 mole) of glycerin and 225.3 g (1.5 moles) of triethylene glycol. Then 20 g of xylene was added. The reaction mixture was heated to 130° C. and 463.6 g (1.0 mole) of tetrabromophthalic anhydride was added over a twenty minute period. The temperature was raised to 190° C. and 45 g of xylene added to maintain reflux. The reflux slowed down after 3.5 hours. Another 10 g of xylene was added. When 18.9 ml of lower layer was collected in the Dean and Stark trap, the acid number was 0.6. The Dean and Stark trap was replaced by a still head, and the content distilled at the pressure of 2.8-4.7 cm of mercury to a residue of 670.4 g.

The product was found to have a hydroxyl number of 234.5, a bromine content of 45.53%, and a Brookfield viscosity of 8700 cps at 25° C.

EXAMPLE 2

A reaction was carried out similar to that described in Example 1. The product was 694.1 g and had a hydroxyl number of 254.9, a bromine content of 44.43% and a Brookfield viscosity of 9,520 cps at 25° C. Equal parts of product from Example 1 and Example 2 were combined. The blend had a hydroxyl number of 244.7 and a bromine content of 44.98%.

EXAMPLE 3

A one liter reaction flask with a Dean and Stark trap was charged with 2.3 g of sodium acetate, 92.1 g (1.0 mole) of glycerin and 159.2 g (1.5 moles) of diethylene glycol. The reaction mixture was heated to 130° C. and 463.6 g (1.0 mole) of tetrabromophthalic anhydride was added over a fifteen minute period. The temperature was raised to 190 ° C. and 819 g of naphtha was added to maintain reflux. Throughout a heating period of 23.5 hours the temperature was maintained between 164° and 187° C. After one hour heating another 7.0 g of naphtha was added. Throughout the heating period the lower water layer of the Dean and Stark trap was periodically drained until a total of 74.5 ml were collected. To replace the diethylene glycol that distilled and was drained from the Dean and Stark trap 19.0 of diethylene glycol was added after eight hours, and 42 g was added after 13 hours. At the end of the heating period, the acid number was decreased to 1.3. The Dean and Stark trap was then replaced by a still head, and the reaction mixture was distilled at a pressure of 3.2 cm of mercury, to a residue of 636.3 g. The product was found to have a hydroxyl number of 258.9, a bromine content of 48.22%, and a Brookfield viscosity of 375,000 cps at 25° C.

EXAMPLE 4

A one liter reaction flask with a Dean and Stark trap was charged with 2.3 g of sodium acetate, 92.1 g (1.0 mole) of glycerin and 201.3 g (1.5 moles) of dipropylene glycol. The reaction mixture was heated to 130° C. and 463.6 g (1.0 mole) of tetrabromophthalic anhydride was added over a fifteen minute period. The temperature was raised to 190° C. and 18.7 g of naphtha was added to maintain reflux. A temperature of 178° to 188° C. was maintained for 15 hours. During this time 42.3 ml of the lower water layer was drained from the Dean and Stark trap. At this point the acid number decreased to 0.5. The Dean and Stark trap was replaced by a still head and the reaction mixture was distilled at a pressure of 2.6 cm of mercury, to a residue of 671.4 g. The product was found to have a hydroxyl number of 245.7, a bromine content of 46.16%, and a Brookfield viscosity of 1,032,000 cps at 25° C.

EXAMPLE 5

A one liter reaction flask, with a Dean and Stark trap containing 23 ml of xylene, was charged with 3.4 g of sodium acetate, 110.5 g (1.2 moles) of glycerin and 326.4 g (2.17 moles) of triethylene glycol. The reaction mixture was heated to 130° C. and 695.4 g (1.5 moles) of tetrabromophthalic anhydride was added over a 22 minute period. The temperature was raised to 190° C. and 50 ml of xylene added to maintain reflux. The temperature of about 190° C. was maintained. During the heating period the Dean and Stark trap was drained of the aqueous phase whenever 5 ml accumulated. After 6 hours and 20 minutes a total of 35 ml of water was collected. At this point the acid number decreased to 1.1. The reaction product was then transferred to a one liter round bottom flask and placed on a rotary evaporator at a pressure of approximately 3 cm of mercury and a temperature of 95° C. A residue of 1,052.8 g was obtained. The product was found to have a hydroxyl number of 226.8, a bromine content of 44.96%, and a Brookfield viscosity of 24,000 cps at 25° C.

PERFORMANCE DATA

EXAMPLES 6-15

Table I contains data on a set of hand mixed polyurethane foam compositions made using the flame retardant polyol blend from Example 2. Other ingredients used in preparing the foam include:

Poly G 71-530, a trademark of Olin Chemicals, which is a sucrose-amine type polyether polyol with a hydroxyl number of 530±10.

Dow Corning 193, a registered trademark of Dow Corning Corporation, which is a nonhydrolyzable silicone glycol copolymer surfactant designed for use in producing all types of rigid urethane foam.

Polycat 8, a trademark of Abbott Laboratories, refers to N,N'-dimethylcyclohexylamine, a tertiary amine catalyst.

T-12, a trademark of M and T chemicals, refers to a dibutyl tin dilaurate catalyst containing 18% $Sn^{IV}$.

Freon 11B, available from E. I. duPont DeNemours and Co., Inc., refers to trichlorofluoromethane, a blowing agent.

PAPI 135, a trademark of Upjohn Polymer Chemicals, refers to a polymethylene polyphenylisocyanate with an average functionality of 2.7.

The flame retardant polyol as prepared in Example 2, Poly G 71-530, Dow Corning 193, Polycat 8, T-12 and Freon 11B were weighed and charged into a plastic container. The mixture was blended for 45 seconds with an electric mixer. PAPI 135 was then weighed and added to the mixture and blended for 15 seconds. The mixture was then transferred to a cardboard box and the foam was allowed to rise. The entire procedure was carried out at room temperature.

Two tests were used to evaluate the flame retardant properties of these polyurethane foam compositions. They were the ASTM D-1692 and the Oxygen Index Test. ASTM D-1692 is a small scale horizontal laboratory screening procedure for measuring the rate of burning or extent of burning of rigid or flexible cellular plastics such as polyurethane foams. The Oxygen Index Test is defined as the minimal volume fraction of oxygen in a slowly rising gaseous atmosphere that will sustain the candlelike burning of a stick of polymer. The higher the Oxygen Index of a molded article, the more flame retardant it is.

The composition of each foam is given in parts by weight.

TABLE I

| EXAMPLE | EVALUATION OF POLYOL FROM EXAMPLE 2 | | | | | | | | | |
|---|---|---|---|---|---|---|---|---|---|---|
| | 6 | 7 | 8 | 9 | 10 | 11 | 12 | 13 | 14 | 15 |
| Polyol from Ex. 2 | 0 | 10 | 25 | 25 | 25 | 33 | 33 | 50 | 50 | 100 |
| 71-530 | 100 | 90 | 75 | 75 | 75 | 67 | 67 | 50 | 50 | — |
| DC-193 | 3.0 | 1.5 | 1.5 | 2.0 | 2.0 | 2.5 | 2.5 | 3.0 | 3.0 | 3.0 |
| Polycat 8 | 0.5 | 2.5 | 2.5 | 1.5 | 1.0 | 0.7 | 0.5 | 0.5 | 0.2 | 1.0 |
| T-12 | 0.03 | — | — | 0.03 | 0.06 | 0.06 | 0.1 | 0.1 | 0.06 | 0.03 |
| Freon 11B | 38.0 | 40 | 40 | 40 | 40 | 40 | 40 | 40 | 40 | 40 |
| PAPI 135 | 139.0 | 131.3 | 120.1 | 120.1 | 120.1 | 114.1 | 114.1 | 101.4 | 101.4 | 63.9 |
| Isocyanate index, % | 110 | 110 | 110 | 110 | 110 | 110 | 110 | 110 | 110 | 110 |
| Density, lbs./cu. ft. | 1.8 | 1.8 | 1.7 | 1.6 | 1.6 | 1.5 | 1.6 | 1.5 | 1.5 | 1.3 |
| Oxygen Index | 20.0 | 20.6 | 21.4 | 21.4 | 21.6 | 21.8 | 22.0 | 22.9 | 22.6 | 26.1 |
| D-1692 burn rate, in./min. | 4.2 | 2.7 | 1.5 | 1.5 | 1.8 | 1.4 | 4.2 | 0.8 | 0.9 | 1.1 |
| D-1692 extent of burn, in. | 6.0 | 3.4 | 1.0 | 1.1 | 1.3 | 0.9 | 3.3 | 0.6 | 0.6 | 0.5 |

As indicated in Table I, the polyurethane foam samples which contain a larger amount of flame retardant polyol blend from Example 2 demonstrate improved flame retardant properties when evaluated by the Oxygen Index and ASTM D-1692 burn test.

EXAMPLES 16-17

Table II contains data on a set of hand mixed polyurethane foam compositions containing the flame retardant polyol ester from Example 5. These foams were prepared in the same manner and with the same ingredients as described in Examples 6-15.

TABLE II

| EVALUATION OF POLYOL FROM EXAMPLE 5 | | |
|---|---|---|
| EXAMPLE | 16 | 17 |
| Polyol from Example 5 | 0.0 | 40.0 |
| 71-530 | 100.0 | 60.0 |
| DC-193 | 3.0 | 3.0 |
| Polycat 8 | 2.0 | 1.0 |
| T-12 | 0.03 | 0.03 |
| Freon 11B | 34.0 | 30.0 |
| PAPI 135 | 139.0 | 107.0 |
| Isocyanate Index, % | 110.0 | 110.0 |
| Density, lbs./cu. ft. | 2.0 | 1.8 |
| D-1692 burn rate in./minute | 3.6 | 1.2 |
| D-1692 extent of burn, in. | 6.0 | 0.7 |

As indicated in Table II, the polyurethane foam samples which contain a larger amount of flame retardant polyol from Example 5 demonstrate improved flame retardant properties when evaluated by the ASTM D-1692 burn test.

I claim:

1. A normally liquid flame retardant polyol ester prepared by a process comprising reacting a halogen containing anhydride of a dicarboxylic acid or a mixture, of said anhydrides wherein said anhydride has the structure:

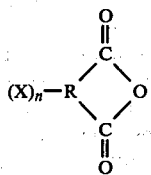

wherein R is a hydrocarbon group having the valence n+2 and is selected from the group consisting of benzene groups, naphthalene groups and alicyclic hydrocarbon groups containing 5 to 10 carbon atoms, X is selected from the group consisting of bromine and chlorine and n is an integer from 1 to 6, with about 0.1 to about 1.5 moles of an aliphatic polyol having at least three hydroxy groups per mole of said anhydride and about 0.5 to about 20 moles of an aliphatic diol per mole of said anhydride, at a temperature of about 100° C. to 250° C., to obtain a substantially fully esterified halogen containing product in which the acid number does not exceed 10 with the optional removal of unreacted diol during the course of the reacting or subsequent to the reacting.

2. A polyol ester, as recited in claim 1, wherein said anhydride is tetrahalophthalic anhydride.

3. A polyol ester, as recited in claim 2, wherein said tetrahalophthalic anhydride is tetrabromophthalic anhydride.

4. A polyol ester, as recited in claim 3, wherein said diol is a polyalkylene glycol having the formula HO—(RO)$_p$H wherein p is an integer from 2 to about 100 and R is a divalent aliphatic hydrocarbon group containing about 2 to about 4 carbon atoms.

5. A polyol ester, as recited in claim 4, wherein said diol is triethylene glycol.

6. A polyol ester, as recited in claim 1, wherein about 1.0 to about 1.5 moles of said aliphatic diol are reacted per mole of said anhydride.

7. A polyol ester, as recited in claim 6, wherein said aliphatic polyol having at least three hydroxy groups is glycerine.

8. A polyol ester, as recited in claim 1, wherein about 0.8 to about 1.0 moles of said aliphatic polyol having at least three hydroxy groups are reacted per mole of said anhydride.

9. A polyol ester, as recited in claim 8, wherein some diol is reacted with said anhydride and unreacted diol is removed during the course of or subsequent to the reacting.

10. A polyurethane composition comprising the reaction product of said flame retardant polyol ester of claim 1 and a diisocyanate, polyisocyanate or isocyanate terminated pre-polymer.

11. A flame retardant, self-extinguishing polyurethane made by reacting a mixture comprising:
(a) said flame retardant polyol ester of claim 1,
(b) organic diisocyanate, polyisocyanate or isocyanate terminated pre-polymer at least sufficient to react with said polyol ester to produce polyurethane, and
(c) a catalyst.

12. A flame retardant, self-extinguishing polyurethane foam made by reacting a mixture comprising:
(a) said flame retardant polyol ester of claim 1,
(b) organic diisocyanate, polyisocyanate or isocyanate terminated pre-polymer at least sufficient to react with said polyol to produce polyurethane,
(c) a foam-forming catalyst, and
(d) a blowing agent.

* * * * *

UNITED STATES PATENT AND TRADEMARK OFFICE
CERTIFICATE OF CORRECTION

PATENT NO.   :   4,468,480
DATED        :   AUGUST 28, 1984
INVENTOR(S)  :   HENRY J. BARDA

It is certified that error appears in the above-identified patent and that said Letters Patent is hereby corrected as shown below:

Column 11, line 48, reads "20 moles" and should read -- 2.0 moles --.

Signed and Sealed this

Eighth Day of January 1985

[SEAL]

Attest:

Attesting Officer

GERALD J. MOSSINGHOFF

*Commissioner of Patents and Trademarks*